(12) United States Patent
Cabrera

(10) Patent No.: US 6,970,155 B2
(45) Date of Patent: Nov. 29, 2005

(54) OPTICAL RESONANT GEL DISPLAY

(75) Inventor: Florencio Cabrera, New York, NY (US)

(73) Assignee: Light Modulation, Inc., New York, NY (US)

(*) Notice: Subject to any disclaimer, the term of this patent is extended or adjusted under 35 U.S.C. 154(b) by 168 days.

(21) Appl. No.: 10/638,711

(22) Filed: Aug. 11, 2003

(65) Prior Publication Data

US 2004/0164950 A1 Aug. 26, 2004

Related U.S. Application Data

(60) Provisional application No. 60/403,520, filed on Aug. 14, 2002.

(51) Int. Cl.[7] ............................................. G09G 3/34
(52) U.S. Cl. ..................... 345/107; 345/86; 204/606; 359/296
(58) Field of Search ........................... 345/107, 86, 87, 345/111; 204/600, 605, 606; 359/296; 434/409

(56) References Cited

U.S. PATENT DOCUMENTS

| | | | |
|---|---|---|---|
| 3,938,263 A * | 2/1976 | Tate | 434/409 |
| 5,295,837 A * | 3/1994 | Gilano et al. | 434/409 |
| 6,187,523 B1 * | 2/2001 | Aylward et al. | 430/527 |
| 6,352,748 B1 * | 3/2002 | Aylward et al. | 428/14 |

* cited by examiner

Primary Examiner—Ricardo L. Osorio
(74) Attorney, Agent, or Firm—Baker Botts L.L.P.

(57) ABSTRACT

A white or colored thixotropic gel is used in conjunction with an electro-mechanical addressable X-Y pixel array composed of micro-magnet pairs in order to produce a re-writable display surface for forming images. Images are formed on the surface of this display by changing the state of transparency of the gel surface, from semi-solid to semi-liquid as a result of thixotropic bond shearing. In addition, pixels are capsules filled with any given color. Furthermore, each active color capsule is forced upwards by magnetic repulsion between the twin-micro-magnet elements to help form images and break the surface tension of the gel and press against the front layer film and forming a visible pixel or; downwards to help erase the image by means of magnetic attraction between the two micro-magnets located directly underneath each pixel. In an embodiment of this invention, four or more layers of materials are bonded together in a flexible construct in order to provide to users a low-cost electronic paper-like display.

1 Claim, 7 Drawing Sheets

FIG. 1
CROSS SECTIONAL VIEW OF ORG DISPLAY
ILLUSTRATING COLOR CAPSULE PIXELS
"ON STEADY-STATE" FOR FORMING IMAGES
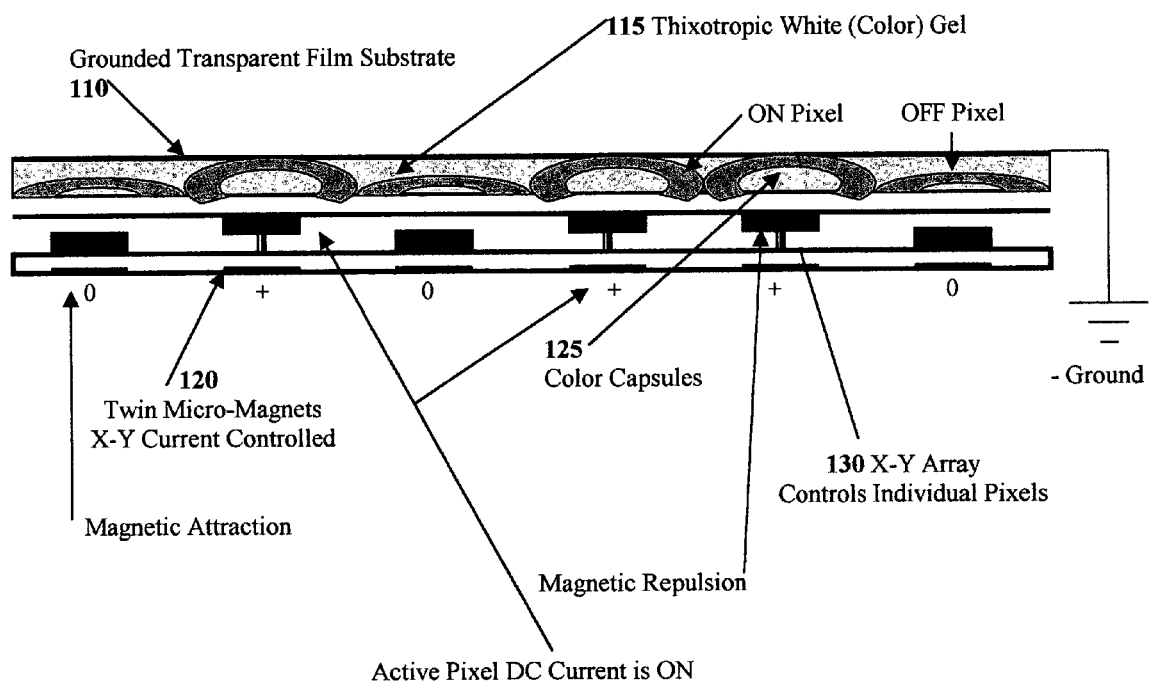
| PIXEL "OFF" STATE | PIXEL "ON" STATE |
| --- | --- |
| SURFACE IS WHITE (COLORED) | SURFACE IS TRANSPARENT |
| THIXOTROPIC GEL SEMI-SOLID | THIXOTROPIC GEL SEMI-LIQUID |
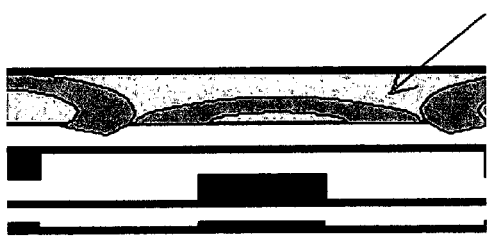
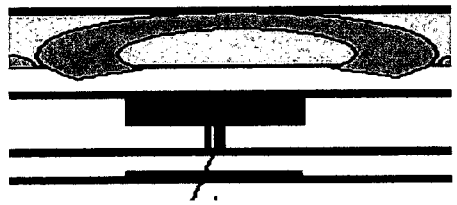

FIG. 2
ENLARGED DETAIL CROSS SECTIONAL VIEW
ON State activates Pixel by Magnetic Repulsion and "melting" of thixotropic gel.
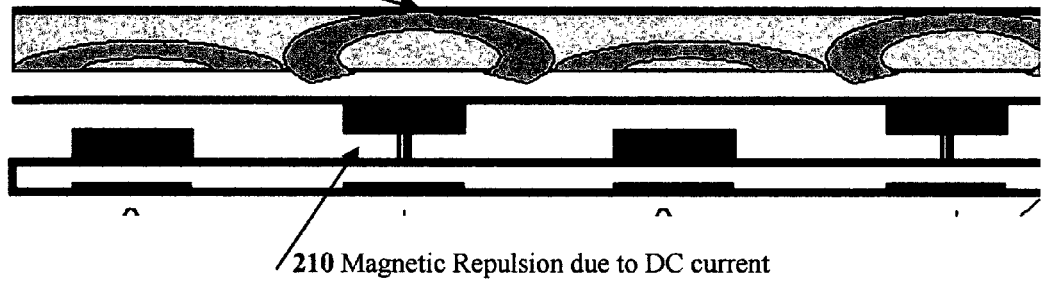
210 Magnetic Repulsion due to DC current
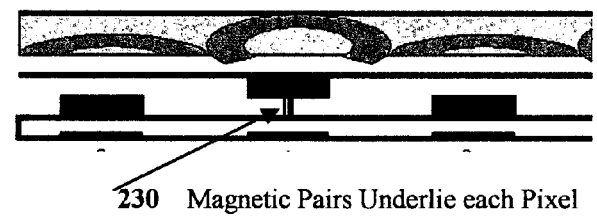
230 Magnetic Pairs Underlie each Pixel
ON & OFF STATES OF PIXES
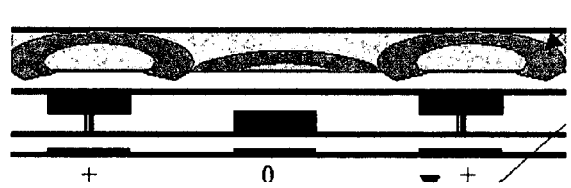

XY MATRIX ARRAY LAYER TOP VIEW

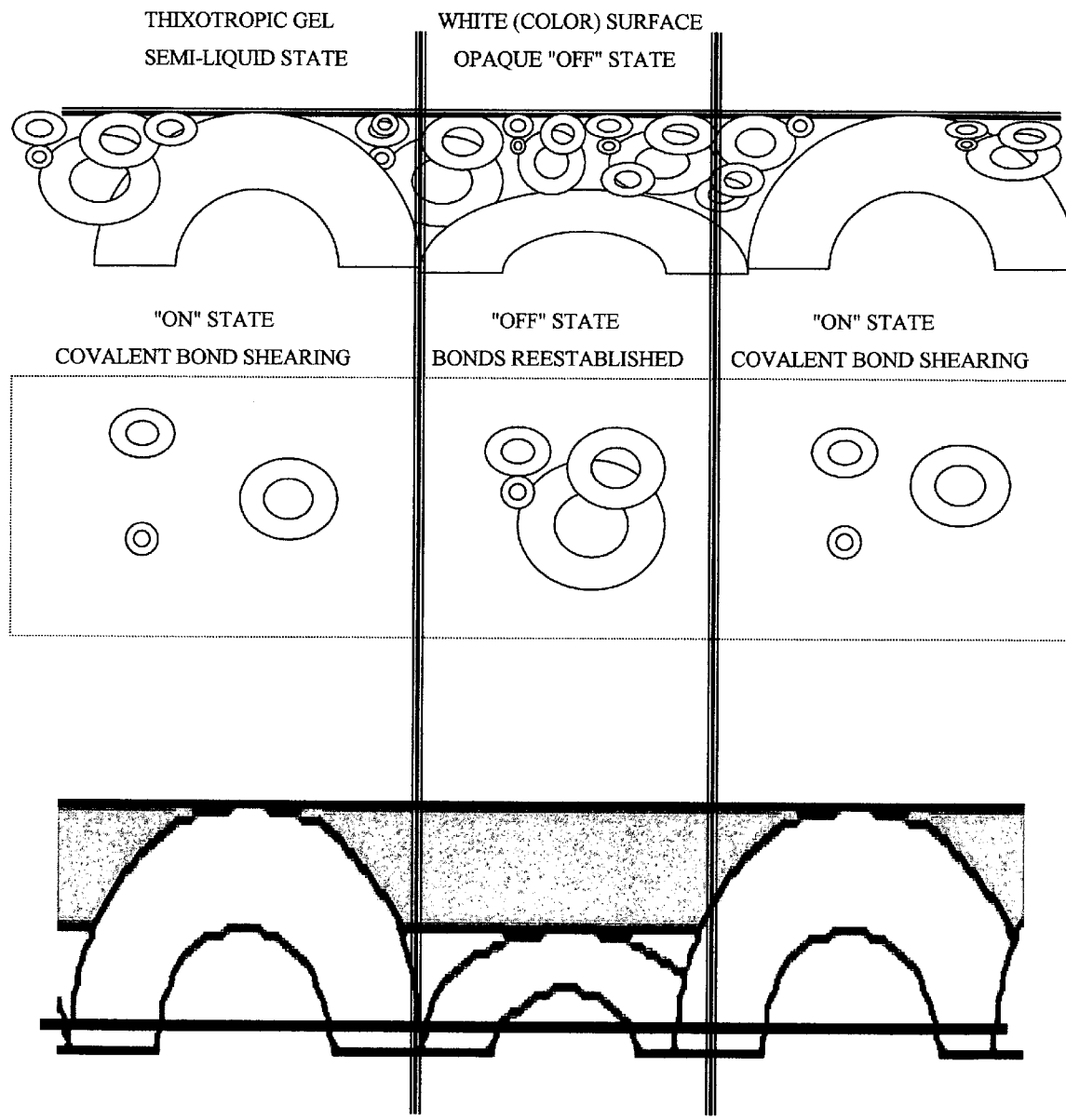

FIG. 5
ILLUSTRATION OF PREFERRED EMBODIMENT

510 OPTICAL RESONANT GEL AND TRANSPARENT FILM

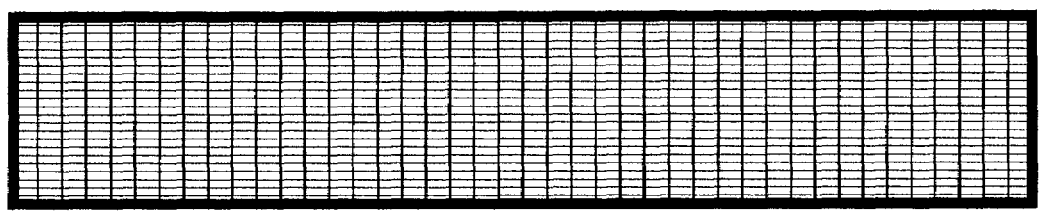

520 XY ARRAY OF ULTRA-THIN COPPER WIRES FOR PIXEL CONTROL

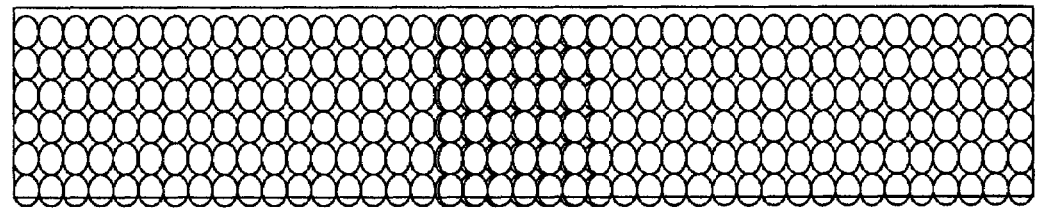

530   COLOR CAPSULES ARRANGED IN XY MATRIX
WITH MICRO-MAGNET PAIRS CONTROLLED BY CURRENT

Flexible Circuit Board

550  ACKNOWLEDGEMENT SIGNAL GENERATION CIRCUIT
AND MICRO-CONTROLLER, INCLUDING ULTRA-WIDE BAND,
OR RADIO FREQUENCY BURST / ULTRA-LOW FREQUENCY

FIG. 6
ILLUSTRATION OF OPTICAL RESONANT GEL DISPLAY
FOR USE AS AN ELECTRONIC PRICE STRIP AT THE SHELF-EDGE
610 OPTICAL RESONANT GEL AND TRANSPARENT FILM
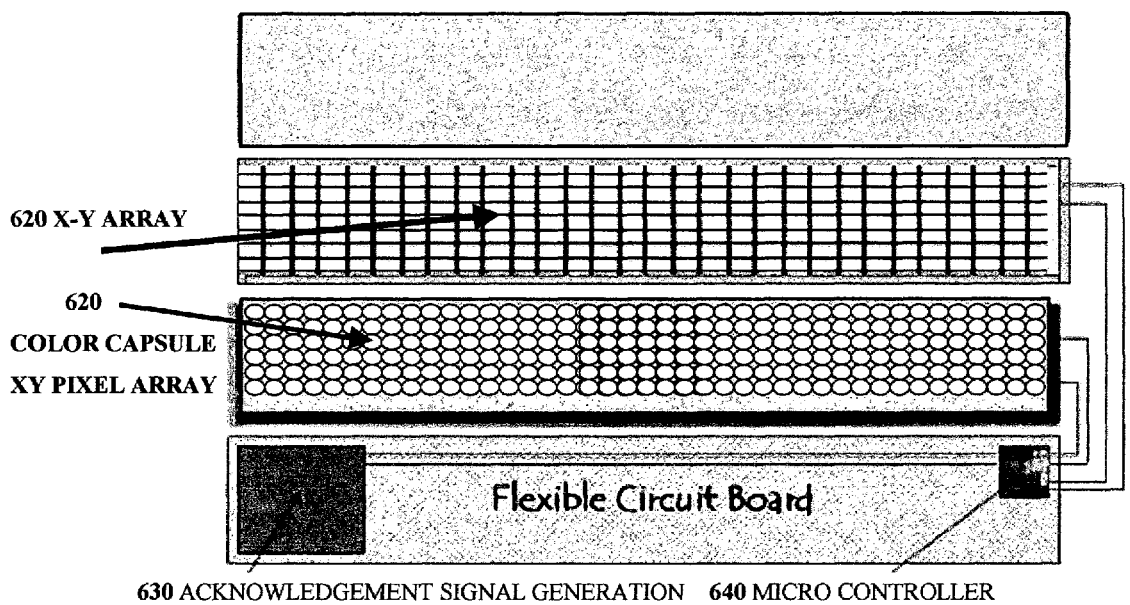
620 X-Y ARRAY
620 COLOR CAPSULE XY PIXEL ARRAY
630 ACKNOWLEDGEMENT SIGNAL GENERATION    640 MICRO CONTROLLER
PREFERRED EMBODIMENT AS ELECTRONIC PRICE STRIPS OR REFERRED HEREIN AS "LIGHTPAPER"
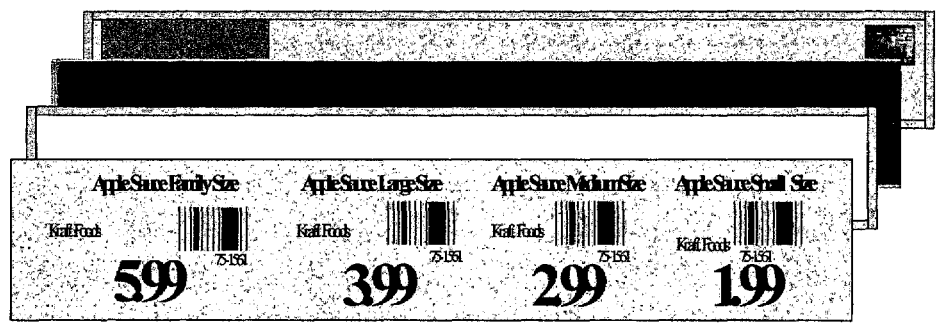

DYNAMIC "ON" AND "OFF" PIXELATION FOR IMAGE FORMATION
FUNCTIONAL BLOCK DIAGRAM

OPTICAL RESONANT GEL DISPLAY

This application claims the benefit of Provisional Application Ser. No. 60/403,520 filed Aug. 14, 2002.

FIELD OF THE INVENTION

The present invention relates generally to electronic and wireless low cost paper-like displays and more particularly relates to electrophoretic and other types of bi-stable displays for applications like the automation of shelf tags, where the realization of the lowest cost architecture for a wireless display system is critical for large-scale adoption.

The present invention relates generally to optical data communications systems and more particularly relates to data communications systems which employ modulated ambient light as the carrier of information. The present innovation is an optical data detector which utilizes different layers of materials so as to produce a wireless paper-like electronic display, capable of forming and refreshing images broadcasted by an optical information network to the detector so as to enable alphanumeric and content rich visual information to be displayed with high quality at a low cost in an electronic and wireless manner for the retail, consumer, commercial, industrial, and institutional environments. From many applications that include paper price labels at the shelf-edge of supermarkets to merchandising signs at "big box" and department stores, this invention is referred to as an "Optical Resonant Gel Display" and it proposes an improvement over prior art by disclosing a four layered composite wireless display.

Prior art innovations in the field of wireless and low-cost display technologies have largely failed to produce an electronic display of such characteristics that it could be described as really "paper-like." Users demand a new generation of display technologies at a very low-cost and yet capable of forming high-quality images and refreshing them electronically from a remote wireless location as part of an optical display data system.

BACKGROUND OF THE INVENTION

In many types of retail, consumer, industrial and institutional applications, low-cost and yet high-quality paper-like displays are being demanded by users. Problems like the automation of manual labeling have presented a particularly difficult challenge to resolve. In commercial environments for example, advertising and merchandising electrical signage users desire wireless display systems capable of providing high image quality while enabling the formation and refreshing of images in a wireless manner.

The prior art in this wireless display field has typically incorporated radio frequency types of systems that require the use of discreet analogue components and rigid PC board assembly. Other prior art to be found in the field of electronic signage and low-cost wireless displays utilizes infrared systems. The lack of any significant market adoption of prior art paper-like display is directly related to higher cost, greater complexity in the electrochemical and physical properties of the electrophoretic and other paper-like systems and the implied higher costs related with RF and IR installations.

These problems have rendered electronic signage as the last area to be automated with a satisfactory technology in the supermarket and retail industries. For years shelf tags have failed to be automated due to the problems presented by high cost, complexity and lack of image quality. Users demand high image quality coupled with low cost of installation.

Due to the chosen system architecture by the prior art, both of these types of wireless systems RF and IR represent higher power and infrastructure costs. Because of the need for high volume of electronic paper-like displays for effective solution of pricing and merchandising needs, a new type of wireless paper-like display is needed. This innovation discloses an improvement over this prior art that enable users of breaking the lowest cost barrier for large volume penetration of the supermarket shelf edge and the automation of the paper label function in many different industries.

Some of the limitations of the prior art include: (1) high-cost of wireless communications hardware; (2) lower image quality; (3) unsuitability for large-surface products like road signs or billboards; (3) high power-consumption and (4) lack of a truly paper-white quality surface with similar characteristics to paper including high contrast and high quality colors that include the use of near perfect white as a paper-like background. Therefore, the present invention provides users with a low-cost paper-like display capable of wirelessly controlling the formation and refreshing of images on this new type of composite material for which we have coined the term "Optical Resonant Gel display.

Many electrophoretic displays have good qualities of brightness and contrast when compared with traditional LCD displays. Nevertheless, whenever these paper-like signs are employed in a wireless application that requires a low-cost per unit, this prior art has proven to be high in power consumption, i.e. requiring batteries and also high in cost due to the related hardware involved in the radio frequency or infrared wireless networking of these signs. In this field of prior art, one finds the use of rigid PC board designs that incorporate discreet analogue parts and mechanical plastic cases. In the field of electronic price tags, prior art designs typically use a plastic housing and a small LCD screen which fails to provide users with color or sufficient image quality for branding.

The purpose of this disclosure is to provide users with a new type of low-cost wireless electronic signage flexible paper-like display, capable of receiving wireless transmission of alphanumeric and visual images by means of optical communications. Images are formed and refreshed while pixels form and are erased by electrochemical methods, that include high contrast, exceptional brightness and wide viewing angles, in a wireless manner and at the lowest-possible cost. This optical system architecture permits the use of photovoltaic materials that not only provide a source for signal detection but also permit the constant recharging of a capacitor circuit in order to power the display.

This optical networking architecture also permits to reduce the part count and to digitize the signal directly from the photovoltaic receiver into the microprocessor, obviating the need for discreet analogue components for signal treatment or pre-amplification.

In addition, the use of an optical broadcasting architecture, permits the use of only four layers of composite materials instead of the traditional rigid PC board with many discreet integrated circuit analogue components. In the case of the present invention, the micro-controller processor provides all of the logic functions required both for signal detection, demodulation, decoding, error-correction and the ensuing display driver management.

Another area of innovation proposed by this invention, is the use of a simple electro-mechanical means for driving the formation of images on the display. This simple method utilizes ultra-thin copper wire X-Y array matrix in order to deliver small currents to the base of each electromechanical pixels. The functionality of the ORG display is provided by means of selectively switching matrices of X and Y coordinates, which in turn result in pixilation of alphanumeric and visual images on the surface of the display. Control for the pixel matrix is provided by a micro-controller processor (MCU) capable of driving a multiplexed array of pixel coordinates. The pixel matrix is originally loaded onto memory on-board the MCU and is then transmitted to the XY coordinates by means of a multiplexer component of the micro-controller which calculates the image and issues the necessary commands to switch DC current to the specified coordinate matrix.

Prior art display technology has largely failed to deliver the value to users due to high cost per unit, complex-retrofitting installations, and complicated integration with different software systems. In this field of use, hardware specific flaws like high power, rigid architecture, have directly contributed to a very low adoption rate.

Despite the fact that prior art innovations in electrophoretic encapsulation have led to better image quality, the problems related with wireless communications like RF and IR hardware and the ensuing large power consumption ratios have continued to be present. For many years different electrophoretic display technologies have sought and failed to gain market acceptance and widespread usage. In the case of the prior art, many electrophoretic displays use two-colored color capsules so as to provide a two-color capability for the display. However, since many of the capsules fail to align perfectly in orientation every time, the resolution and color of the surface is of lesser quality.

For example, the use of white and black sided capsules does not result in a pure black and white display, but instead results in a gray surface display due to the natural drift in orientation of many black or white elements. Therefore, the image quality is much lower than that of the present innovation, whereby the method of forming images is one where each pixel is perfectly coated with the surface gel until the moment when it becomes active by electrical current flowing through it.

Once pixels become active, they bulge upwards at the same time that the surface tension of the coating gel is dissolved, exposing the pixel element within the context of a perfectly even and smooth surrounding, formed by the uniform coating gel still semi-solid in the area adjacent to the perimeter. Therefore, image quality and color purity are enhanced and the use of pure black and white and color and white is enabled for display of alphanumeric and visual images.

In general, the resulting physical properties of the display surface are such that a highly uniform surface area is provided for contrast, brightness and resulting in high image quality. The present innovation provides for better control of light absorbency, optical properties, charge, mobility, shape, size, density, surface quality, surface stability and similarity with high quality print paper images. Many encapsulated electrophoretic displays typically may include two or more different types of particles located within the pixel color capsules.

Many of the particles may be of an anisotropic particles and a plurality of second particles also residing within the suspension fluid. Application of an electric current may first cause the anisotropic particles to assume a specific orientation and present a specific optical property. Application of a second electric field may then cause many of the second particles to translate, thereby disorienting the anisotropic particles and resulting in a distortion of the optical qualities of the display's surface.

Likewise, the orientation of the anisotropic particles may allow easier translation of the plurality of second particles, also resulting in a deterioration of the optical characteristics. Other types of prior art displays utilizing electro-chemical properties include the electro-osmotic displays. Such types of displays utilize capsules containing a refractive index matching that of the suspension fluid they are in, so as to permit for a more homogeneous surface upon application of an electric field. This method presents greater complications in terms of precise fulfillment of the chemical properties of the suspension fluid and the particles and leads to higher cost of manufacturing.

Therefore, it is desirable to provide an electro-chemical display capable of high quality optical characteristics while at the same time permit for a simplified manufacturing process and resulting lower cost.

Prior art techniques have included diverse types of materials for the creation of electrophoretic displays. These materials have experimented with different types of particles, dyes, suspending fluids and binders used in fabrication of the displays. In some cases the types of particles used include scattering pigments, absorbing pigments and luminescent particles. Such varied types of particles have included titania, which may be coated with a metal oxide or silicon oxide and have been constructed with a retro-reflective coating where microscopically each particle is similar to a cornered cube. Luminescent particles also may include zinc sulfide particles encapsulated with an insulating coating to reduce their electrical conduction and they are typically used in combination with another class of particles that is light absorbing like dyes.

The challenges posed by integrating diverse types of particles with complicated chemical and physical properties renders many of the proposed innovations in the prior art expensive and difficult to manufacture to such exacting parameters. The micro-coating techniques and elaborate combinations of electrophoretic particles required are expensive and result in slower manufacturing processes methods.

SUMMARY OF THE INVENTION

It is the purpose of this disclosure to provide users with a low-cost wireless paper-like display that is able to provide high-image quality, is low-cost and easy to install and may be scaled to larger surface areas than any of the prior art technologies.

One of the key proposed improvements over the prior art by the present invention, is the attainment of high-quality image formation and high quality optical characteristics of the display surface by an architecture of pixels that is simpler and less expensive than the prior art. In the case of the present innovation, pixels do not require the electrophoretic effect and therefore there is no need for highly specific suspension fluid and exacting physical characteristics for suspended particles. This disclosure presents a method whereby each pixel is produced by a single microcapsule of any suitable color that has no suspension liquid nor it has any suspended particles.

By eliminating two complex processes the resulting simplification in the manufacturing process is designed to reduce cost and to improve the ability to deliver higher volume of production. At the same time, since we have eliminated the causes for much of the image degradation and we have eliminated the natural chemistry of diverse particle types and suspension liquids, the Optical Resonant Gel or ORG display provides to users a clear improvement in cost and manufacturability at the same time that it promises to deliver a much higher optical image quality.

The successful construction of a paper-like wireless display requires the combination of several key elements of the system so as to overcome the limitation present in prior art. The prior art displays have depended on useful interactions between the electrophoretic particles and the transparent micro-capsule membranes, so as to provide a physical barrier between the particles and the fluid. It is well known in the prior art, that polymer fluids act many times like adhesive between electrode surfaces and capsule membranes. This type of prior art requires that the binder material be compatible with the capsule and with the bounding electrodes, and must possess properties that allow for printing and/or coating. This type of prior art also requires it to possess barrier qualities for water, oxygen, ultraviolet light, the electrophoretic fluid and other materials. It may also contain surfactants and cross-linking agents in order to aid to the coating and durability characteristics. The polymer-dispersed electrophoretic display is many times of the emulsion or phase separation type and imposes strict parameters for its useful construction. On the other hand, the present invention provides for materials to be used in a new type of display where the physical characteristics of the materials is not as critical and yet allows for greater quality of image and for other advantages over this prior art. Also, the prior art requires each of the particles to be moved or rotated by application of an electric field.

In this invention, application of an electric field causes an electro-mechanical effect that in combination produces a high quality pixel image. By liquefying the coating of the surface for the display and at the same time, bulging upwards the pixel element by magnetic repulsion, forces the formation of a well defined pixel. In addition, due to the nature of this simple ON state for each pixel, it is possible to scale upwards the entire display by using larger and larger gauge of pixel capsules unit each pixel is literally a fist-sized balloon that is able to form a substantially large diameter pixel on the surface of the display. In this manner, the present invention provides for a simpler composite material requirements and permits a less stringent manufacturing parameters, as the method used to form images is electro-mechanical and does not depend on the intrinsic physical characteristics of the fluid, the binder, the membrane and their interaction. Allowing for improvements in cost and permitting large scale manufacturing.

Another problem or limitation that is characteristic of the prior art is the need for alignment of particles in such a way so that the surface of such display is aligned generally in the same direction so as to allow for uniform reflection and absorption of light. For many years, the problems associated with contrast and viewing angle resulted in lower image quality, whenever the surface electrophoretic particles failed to align uniformly and produced a less than desirable level of contrast and reflectivity. This led to early image deterioration and to poor resolution or poor quality. Both necessary in the merchandising and advertising applications where image quality for branding and product image is of paramount importance.

One of the key characteristics offered by the present innovation is for a highly reflective surface that is very uniform and bright and able to provide excellent contrast and viewing angle so as to closely replicate that of high grade white paper. The Thixotropic white (or other color) gel produces one of the most "paper-like" surfaces available today, so that both image quality and cost of manufacturing are improved simultaneously with a simple electromechanical paper-like system architecture.

The present invention is different from other prior art gels which use certain types of halogenated hydrocarbon, such as tetra-chloro-ethylene. These types of prior art displays attempt to modulate the density of the particles suspended in a fluid so as to increase or decrease their transparency to light and render them lighter or darker. These types of so called "smart gels" have been proposed for use in LCD modulator types of applications and for adaptive optics like glasses, lenses and even windows. The main drawbacks from this type of gels is the thermoplastic response times are typically slow and thus prevent their use for dynamic image formation. These types of gels also degrade in quality rapidly and lead to image deterioration and drift in different surface locations. These problems have prevented their usage.

It is an object of the present invention to provide an optical detector for a communication system in which the light sources in the environment are modulated using diverse methods of light modulation communications.

It is another object to provide the lowest cost optical detector for use in applications such as electronic shelf tag systems and merchandising signage systems that use light modulation as the network in a manner that is cost-effective and is the simplest and most convenient for the users.

Another innovation proposed by the present invention is the arrangement of these four layers or components in a manner so as to make their manufacturing process most efficient and permit high-speed production and also, so as to minimize the total surface and so as to provide a new type of construct that combines the existing layers into an innovative multi-layered detector capable of useful use together with any optical data communications system.

BRIEF DESCRIPTION OF THE DRAWINGS

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

FIG. 1 is a cross-section of the preferred embodiment of the invention, showing the different layers composing the assembly of this invention as follows: (i) the first layer is a thin-film transparent substrate that is grounded, helping to provide a voltage potential across the thixotropic gel layer and the pixel micro-capsule layer and closing the circuit with the twin-micro-magnet electrodes situated directly underneath each pixel element; (ii) the second layer is composed of a thixotropic gel that is composed of highly reflective colloid particles suspended in a semi-solid state and thereby providing contrast and a reflective surface for the display.

FIG. 1 (continued) This second layer changes its sol state to semi-liquid upon the presence of the shearing force of the DC current when active and becomes highly transparent thereby helping make the active pixel visible; (iii) the third layer is composed of color capsules arranged in rows and columns so as to form a dot-matrix lattice used for the formation of images. These pixel color capsules may be larger for use in a different embodiment of this invention where the display is of larger proportions for use in larger surfaces like road signs and other types of larger scale billboards and such; (iv) the fourth layer is composed of an array of X-Y addressable electrodes connected to a pair of twin magnet square surfaces that produce either an attractive or repulsive magnetic field and deliver a flow of current across the 2nd and 3rd layers above, closing the circuit with the grounded surface layer.

FIG. 2 is an illustration of a cross-section of the invention with some pixels in an active state and others in a passive state. The diagram illustrates the magnetic repulsion created by the DC current flowing between the two micro-magnets and thereby creating a bulging effect where each active pixel is pushed upwards to press against the surface of the first layer. This drawing also illustrates the micro-capsule pixels and the micro-magnet elements underlining them and shows OFF and ON states for the magnet pairs.

FIG. 3 Cross-section with magnification of a pixel element in the OFF state, showing the thixotropic gel covering the pixel completely and providing for a blank and highly reflective surface. The cross-section also shows the pixel micro-capsule element and the underlining twin-magnet control element directly beneath it.

FIG. 3 The same cross-section magnification of a single pixel element in the ON state, showing the effect of a DC current flowing across the three layers and causing the micro-magnet elements to repel each other and resulting in pushing the pixel element upwards against the thin film substrate grounded front panel. This cross-section also illustrates the thixotropic shearing of the bonds of the gel previously covering the pixel element. The illustration shows the semi-liquid and transparent state of the gel and the bulging pixel.

FIG. 4 is a top-to-lateral view of the four layers comprising the display: (i) the first layer being a grounded and transparent thin film; (ii) the second layer composed of the thixotropic gel providing for a contrasting and reflective surface and also allowing for active pixels to become visible by its thixotropic qualities which transform it from semi-solid to semi-liquid; (iii) the third layer composed of an arrangement of the micro-capsule (or larger spheres, depending on the scale of the display) and; (iv) the array of micro-magnet pixel control elements, arranged directly underneath the pixels.

FIG. 5 illustrates the four different layers of the preferred embodiment.

FIG. 6 is an illustration of the preferred embodiment for use in the electronic price tag application within a supermarket or retail environment. The illustration also shows the different layers required for the composite Optical Resonant Gel Display.

PREFERRED EMBODIMENT

Figure 3:
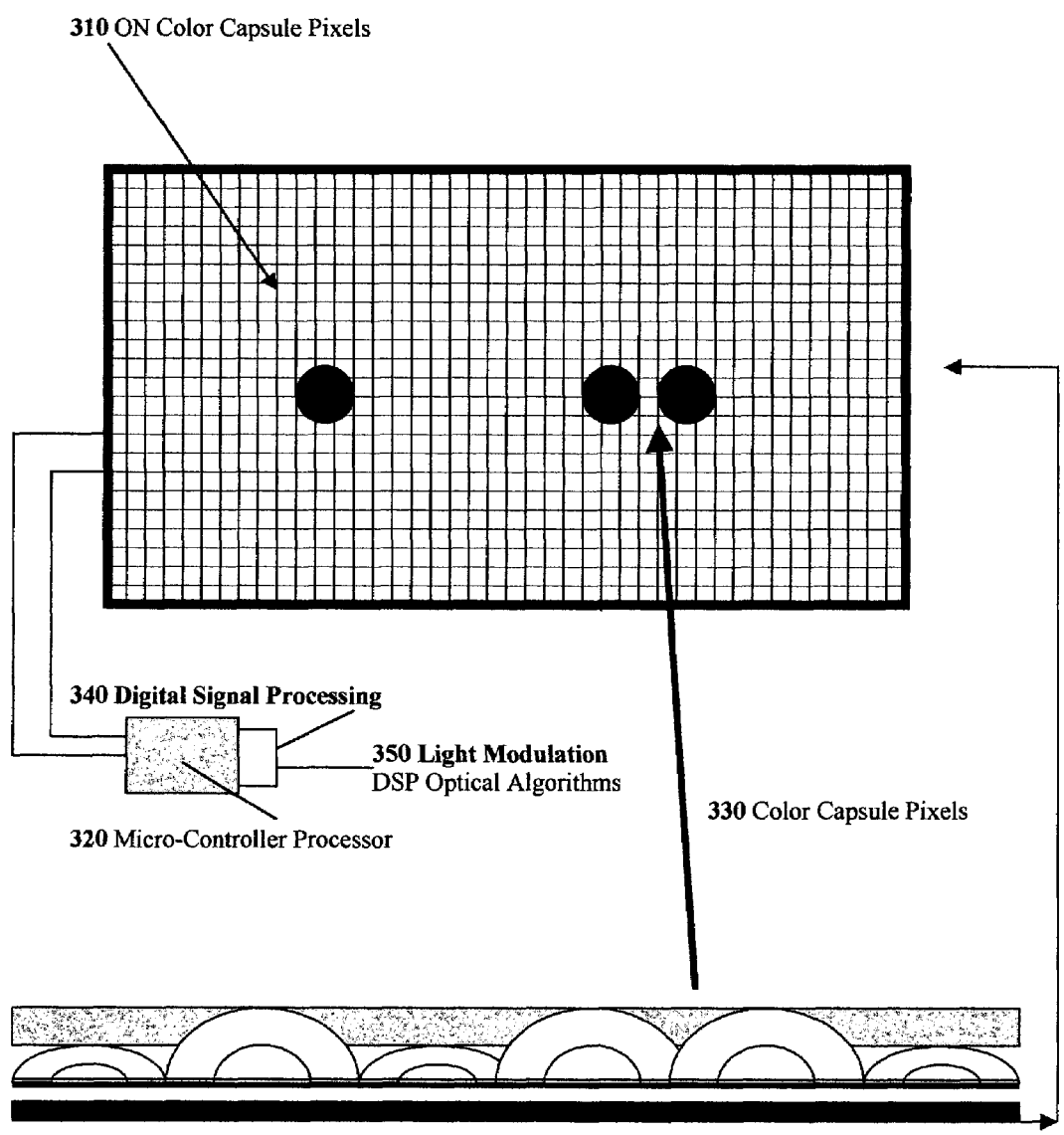
FIG. 3 a top-view of the X-Y array of micro-magnet pixel control elements and the matrix of electronic connector wires that underlines them, as well as the flexible substrate film on which this layer is mounted for placement directly below the pixel elements.
Figure 7:
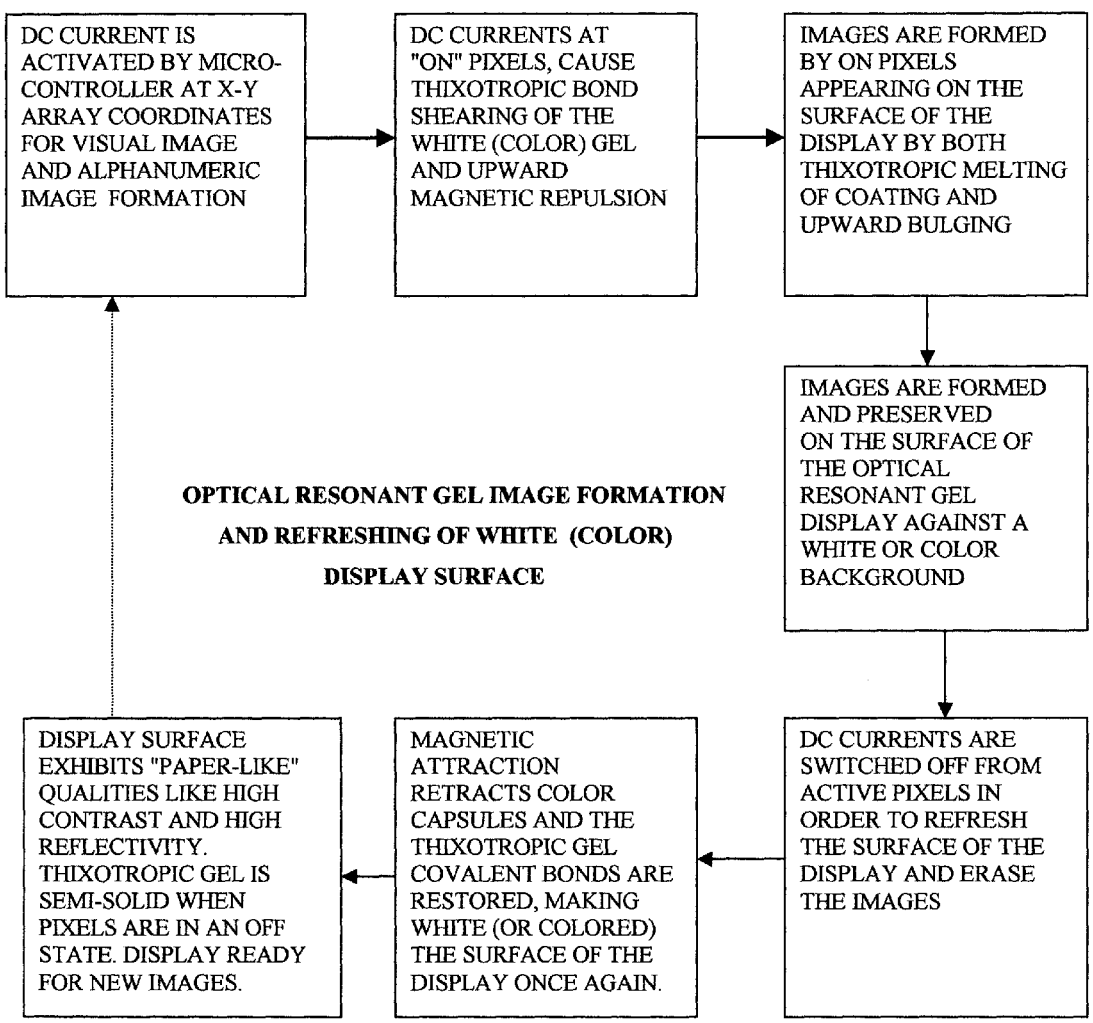
FIG. 7 is a functional block diagram describing the ON and OFF states for image formation and refreshing of the Optical Resonant Gel Display.

The preferred embodiment is a flexible composite layered architecture comprising:

(i) a white (or any other suitable color) thixotropic gel coating first surface layer, used in conjunction with an electro-mechanical addressable X-Y pixel array located directly underneath this first layer. Images are formed on the surface of this display by changing the state of transparency of the gel surface, from semi-solid to semi-liquid as a result of thixotropic bond shearing. In addition to the electrical current covalent bond shearing of the gel, images are also formed by each active pixel being forced upwards by magnetic repulsion between the twin-micro-magnet elements to help form images and break the surface tension of the gel and press against the front layer film and forming a visible pixel or; downwards to help erase the image by means of magnetic attraction between the two micro-magnets located directly underneath each pixel.

(ii) a second layer located directly behind the ORG layer and comprised of an X-Y array matrix display driver for the purpose of forming images and constructed by hundreds of ultra-thin copper wires; such driver layer being flexible and able to form images in the display surface by placing an electrical charge at any given X-Y pixel coordinate locations, based on information extracted from the optically demodulated light signals by means of a micro-controller unit that is connected to this second layer.

(iii) a third layer composed of a photovoltaic or other suitable optical receiver located around the perimeter or other suitable location, for purposes of detection of the light modulated signals for display of images;

(iv) a fourth layer that is comprised of a flex-on-circuit or flexible circuit board incorporating a suitable micro-controller processor unit that is capable of forming and refreshing images on the Optical Gel display by means of placing and removing electrical currents at any given X-Y coordinate matrix.

The method for construction and the arrangement of different layers of this invention is designed to exploit the thixotropic properties of certain colloids in order to produce a white gel surface that is highly reflective. Images and symbols are impressed and then erased from the display by means of activating ON or turning OFF a DC current under each individual X-Y addressable pixel element in the display. During the OFF state, the surface of the display appears highly reflective and appears generally like a blank surface, i.e. pixels are not visible whenever the display is in an OFF state.

Upon turning on a DC current under one or more pixel elements, each pixel becomes visible on the surface of the display by means of an electromagnetic force which pushes the pixel upwards at the same time the DC current shears the covalent bonds of the thixotropic white gel surface, allowing for the active pixel to appear on the surface of the white gel display. Upon turning the DC current OFF under each pixel, the electromagnetic force is reversed and the pixel is pulled downwards at the same time that the thixotropic bonds are restored and the white gel returns to a semi-solid and opaque state above the said inactive pixel. A method for assembly and manufacturing of the display is also disclosed.

By incorporating a suitable micro-controller, this invention is able to detect and demodulate optical data signals that may be in the realm of amplitude, frequency or phase and that may be produced by a number of different methods for optical light modulation. The present invention is also able to detect changes in luminosity that may include rapid and narrow pulses impressed upon the line voltage of light fixtures and that may cause standard lamps to be modulated for optical data transmission. In some embodiments, the optical detectors of the present invention use digital signal processing with real-time dynamic comparator functions on-board to detect and demodulate the optical signals.

This invention is able to detect the signals produced by one or more optical transmitters and may use digital signal processing techniques, or may use analogue circuitry techniques. These techniques are based on a design for a "smart detector" capable of learning about the light signature and light signals from a suitable system.

Upon execution of the configuration command, the micro-controller located inside each detector, by means of digitizing and processing the incoming light signals, takes a "photograph" of the light signature that is being detected from its particular location. This "photograph" is used as a comparator and creates a mask for the underlying unmodulated light signature. This dynamic comparator subtracts the total ambient light signature from the modulated light signature and registers only the delta changes in the light signature.

These delta changes produce the resulting byte of light digital data in terms of "present or not present" at any particular point in time. Since each comparator is created from the actual detector conditions at each specific location, each detector is able to distinguish delta changes to the light signature and is also able to update on a real-time basis the comparator it uses. Upon initial set-up for each detector, a configuration command is manually started for the detector to "listen" or rather "see" the illumination and the light signature of its environment. This light signature is the product of different types of electrical light fixtures which are all incident upon it and contribute to an overall ambient light environment. This is the total illumination environment and is specific for each location and for each detector.

The digital signal processing techniques include the use of a Fourier transform equation that translates voltage from the analogue light waveform into frequency in time. This voltage to frequency translation is then passed on for decoding and display by the micro-controller module or the ASIC chip on-board each Detector.

The digital signal processing includes the capability of the detectors to demodulate a very wide variety of light signatures resulting from a very wide range of lamps and illumination conditions. The ability to detect such diverse and random types of light signatures is also claimed and the digital signal processing algorithms and mathematical formulae are part of the application specific claims of my invention

What is claimed is:

1. A display device comprised of a composite of the following layers:
   (i) a grounded transparent substrate film used to protect the thixotropic layer located directly underneath and used to provide a voltage potential across the thixotropic layer and the base of the micro-magnet X-Y array element under each pixel; (ii) a thixotropic gel layer composed of white or other colored colloid particles which exhibit covalent bond shearing upon the presence of a DC current and exhibiting the property of such bonds being re-established upon removal of the shearing current; (iii) an X-Y array of color capsule pixels organized in a dot-matrix arrangement, aligned in rows and column matrices and glued to a very flexible substrate film;
   (iv) an X-Y array of micro-magnet pairs each connected to a grid of very-thin electrical connectors and located directly underneath each one of the micro-capsule pixels in order to raise them by magnetic repulsion and to liquefy the gel surface directly above them by thixotropic bond shearing cause by the current.

* * * * *